(12) United States Patent
Song et al.

(10) Patent No.: US 10,656,721 B2
(45) Date of Patent: May 19, 2020

(54) INTERACTIVE THREE-DIMENSIONAL DISPLAY APPARATUS AND METHOD

(71) Applicant: SAMSUNG ELECTRONICS CO., LTD., Suwon-si (KR)

(72) Inventors: Hoon Song, Yongin-si (KR); Yuntae Kim, Suwon-si (KR); Juwon Seo, Osan-si (KR); Hongseok Lee, Seoul (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 163 days.

(21) Appl. No.: 15/374,505

(22) Filed: Dec. 9, 2016

(65) Prior Publication Data

US 2017/0235372 A1 Aug. 17, 2017

(30) Foreign Application Priority Data

Feb. 16, 2016 (KR) ........................ 10-2016-0017769

(51) Int. Cl.
*G06F 3/01* (2006.01)
*H04N 13/161* (2018.01)
(Continued)

(52) U.S. Cl.
CPC ............. *G06F 3/017* (2013.01); *G03H 1/024* (2013.01); *G03H 1/2286* (2013.01); *G03H 1/2294* (2013.01); *G06F 3/011* (2013.01); *G06F 3/013* (2013.01); *G06F 3/0304* (2013.01); *G06F 3/0426* (2013.01); *G06F 3/04815* (2013.01); *G06F 3/04842* (2013.01); *G06K 9/00355* (2013.01); *G06K 9/00604* (2013.01); *G06K 9/209* (2013.01); *G06K 9/2081* (2013.01); *G06T 7/20* (2013.01); *G06T 7/246* (2017.01); *G06T 7/70* (2017.01); *G06T 7/73* (2017.01);
(Continued)

(58) Field of Classification Search
None
See application file for complete search history.

(56) References Cited

U.S. PATENT DOCUMENTS 8,395,616 B2 3/2013 Schwerdtner
8,804,220 B2 8/2014 Leister et al.
(Continued)

FOREIGN PATENT DOCUMENTS

JP 2007-18053 A 1/2007
KR 10-2015-0051769 A 5/2015

*Primary Examiner* — Parul H Gupta
(74) *Attorney, Agent, or Firm* — Sughrue Mion, PLLC

(57) ABSTRACT

An interactive 3D display apparatus and method are provided. The interactive 3D display apparatus includes a hand sensing module configured to acquire a hand image by detecting a hand of a user and a user interaction module configured to generate a virtual object adjustment parameter by analyzing user-intended information about the hand based on the hand image acquired by the hand sensing module and comparing an analysis result with predefined user scenarios, an image rendering module configured to set a scene according to the generated virtual object adjustment parameter, generate image data by rendering the set scene, and convert the generated image data into display data, and a 3D display configured to display a 3D image including a virtual object in which a change intended by the user has been reflected according to the display data.

20 Claims, 13 Drawing Sheets

(51) Int. Cl.
- *H04N 13/383* (2018.01)
- *H04N 9/31* (2006.01)
- *G03H 1/22* (2006.01)
- *G06K 9/20* (2006.01)
- *H04N 13/302* (2018.01)
- *H04N 13/32* (2018.01)
- *G06K 9/00* (2006.01)
- *G06F 3/03* (2006.01)
- *G06T 7/73* (2017.01)
- *G06T 7/246* (2017.01)
- *G06F 3/042* (2006.01)
- *G06T 7/70* (2017.01)
- *G03H 1/02* (2006.01)
- *G06F 3/0481* (2013.01)
- *G06F 3/0484* (2013.01)
- *G06T 7/20* (2017.01)
- *H04N 13/279* (2018.01)
- *G03H 1/00* (2006.01)

(52) U.S. Cl.
CPC ......... *H04N 9/3102* (2013.01); *H04N 9/3126* (2013.01); *H04N 9/3161* (2013.01); *H04N 13/161* (2018.05); *H04N 13/302* (2018.05); *H04N 13/32* (2018.05); *H04N 13/383* (2018.05); *G03H 2001/0061* (2013.01); *G03H 2001/2226* (2013.01); *G03H 2223/23* (2013.01); *G06T 2207/30196* (2013.01); *H04N 13/279* (2018.05)

(56) References Cited

U.S. PATENT DOCUMENTS

| | | | |
|---|---|---|---|
| 8,847,919 B2 | 9/2014 | Krah | |
| 9,116,666 B2 | 8/2015 | Salter et al. | |
| 2004/0091845 A1* | 5/2004 | Azerad | G09B 23/283 434/263 |
| 2008/0231926 A1* | 9/2008 | Klug | H04N 13/327 13/327 |
| 2009/0022367 A1* | 1/2009 | Sasaki | G01B 11/25 382/103 |
| 2011/0202306 A1* | 8/2011 | Eng | A61F 4/00 702/150 |
| 2012/0050273 A1 | 3/2012 | Yoo et al. | |
| 2012/0157203 A1* | 6/2012 | Latta | G06F 3/005 463/32 |
| 2012/0194418 A1* | 8/2012 | Osterhout | G02B 27/0093 345/156 |
| 2013/0265220 A1* | 10/2013 | Fleischmann | G06F 3/011 345/156 |
| 2014/0101604 A1 | 4/2014 | Han et al. | |
| 2015/0234477 A1* | 8/2015 | Abovitz | G06Q 30/0643 382/103 |
| 2015/0243079 A1* | 8/2015 | Cho | G02B 27/017 345/633 |
| 2017/0257620 A1* | 9/2017 | Takeda | G09G 5/10 |

* cited by examiner

FIG. 3

| Scenario | Mortion | Description | Comment |
|---|---|---|---|
| Select | | Release → Grab<br>GRAB TWO OR MORE FINGERS INCLUDING THUMB | |
| Translation Motion | | Move<br>MOVE HAND IN SELECTED STATE | |
| Throw & Stop | | Move, Release & Stop<br>OPERATION OF RELEASING HAND IN MIDDLE OF MOVING, AND THEN COMPLETELY RELEASING HAND | MOVE VIRTUAL OBJECT IN HAND-MOVING DIRECTION |
| Scale | | Stretch<br>ADJUST DISTANCE BETWEEN TWO GRAB-SHAPED HANDS | USE TWO HANDS |
| Rotation | | Fist & Move<br>MOVE TWO FISTED HANDS IN DIFFERENT DIRECTIONS | USE TWO HANDS |
| On Screen Menu | | Holding Up One Finger<br>HOLD UP INDEX FINGER | CHANGE CONTENTS OF MENU ACCORDING TO SELECTED OBJECT AND CURRENT STATE |
| Menu Selection | | Swipe Finger on menu<br>SWIPE TEXT OF MENU | |
| OK & Cancel | | Thumb Up & Down<br>HOLD UP OR DOWN THUMB | |

INTERACTIVE THREE-DIMENSIONAL DISPLAY APPARATUS AND METHOD

CROSS-REFERENCE TO RELATED APPLICATION

This application claims priority from Korean Patent Application No. 10-2016-0017769, filed on Feb. 16, 2016, in the Korean Intellectual Property Office, the disclosure of which is incorporated herein in its entirety by reference.

BACKGROUND

1. Field

Apparatuses and methods consistent with exemplary embodiments relate to a display apparatus and method, and more particularly, to an interactive three-dimensional (3D) display apparatus and method.

2. Description of the Related Art

Along with the development of various three-dimensional (3D) display techniques, content such as movies, games, and educational content has also been developed. Also, applications for producing such content have been developed.

However, the same interface methods as used for 2D content are typically used to use or produce 3D content.

To use 3D content, a mouse moving in a 2D plane is generally used along with a separate keyboard, button, or the like. However, in this case, an intuitive operation as if an actual object were manipulated cannot be performed.

SUMMARY

One or more exemplary embodiments provide an interactive three-dimensional (3D) display apparatus and method whereby a desired virtual object may be selected in a scene without using a separate keyboard, button, or the like and a state of the virtual object may be adjusted.

Additional exemplary aspects will be set forth in part in the description which follows and, in part, will be apparent from the description, or may be learned by practice of the presented embodiments.

According to an aspect of an exemplary embodiment, an interactive three-dimensional (3D) display apparatus includes: a hand sensing module configured to acquire a hand image by detecting a hand of a user; a user interaction module configured to generate a virtual object adjustment parameter by determining user-intended information about the hand based on the hand image acquired by the hand sensing module and comparing an analysis result with predefined user scenarios; an image rendering module configured to determine a scene according to the generated virtual object adjustment parameter, generate image data by rendering the set scene, and convert the generated image data into display data; and a 3D display configured to display a 3D image including a virtual object in which a change intended by the user has been reflected according to the display data.

The user interaction module may include: a hand position/shape analyzer configured to analyze a position, a shape, and a motion of the hand; and a user scenario search confirmer configured to generate the virtual object adjustment parameter by searching the predefined user scenarios and comparing the analysis result of the hand position/shape analyzer with the predefined user scenarios.

The hand position/shape analyzer may be further configured to parameterize at least one of a hand motion and a hand moving speed by confirming a position of the hand or fingers and recognizing a shape of each finger.

The interactive 3D display apparatus may further include a storage configured to store the predefined user scenarios.

The image rendering module may include a scene setter configured to receive the virtual object adjustment parameter generated by the user interaction module and determine the scene in consideration of virtual object data, a background of each object, and a motion of each object in the scene, a virtual object renderer configured to acquire image data by rendering the scene determined by the scene setter, and a 3D image encoder configured to generate 3D display data, by digitizing the acquired image data, for displaying a 3D image including the virtual object in which the change intended by the user has been reflected.

The scene setter may be further configured to have a scene boundary function of preventing an object from disappearing outside a screen.

The scene setter may be further configured to display a boundary cursor inside the screen, the boundary cursor being adjacent to the object, when the object moves outside the screen and control the object outside the screen when the boundary cursor is manipulated.

The scene setter may be further configured to hold an object to be definitely displayed on the screen and not move outside the screen when a boundary portion of the object overlaps an edge of the screen, and display a holding state of the object.

The scene setter may be further configured to determine a scene, when a virtual object is selected on the screen, so as to select the virtual object by matching a hand and an object when the hand and the object are located in the same region or select the virtual object via a hand-shaped cursor or a virtual string connecting the hand-shaped cursor to the virtual object when the hand and the object are located in different regions.

The hand-shaped cursor may be a hand image cursor or a hand-shaped cursor including dots and lines.

The interactive 3D display apparatus may further include an eye tracking module configured to acquire eye position data by tracking a position of an eye of a viewer, wherein the scene setter may be further configured to receive the eye position data of the viewer and set the scene according to the eye position data of the viewer.

The 3D display may include: a spatial light modulator configured to form a 3D stereoscopic image according to the display data; and a lighting unit configured to provide left-eye illumination light and right-eye illumination light to the spatial light modulator and may be further configured to form an image for a left eye and an image for a right eye.

The interactive 3D display apparatus may further include an eye tracking module configured to acquire eye position data by tracking a position of an eye of a viewer, wherein the lighting unit may further include a beam deflector configured to deflect the left-eye illumination light and the right-eye illumination light according to the eye position data acquired by the eye tracking module.

The 3D display may include: a light source; at least one projection optical element configured to focus light emitted from the light source on a focal plane; a plurality of holographic optical elements placed between the light source and the projection optical element, having an interference pattern formed to diffract the light emitted from the light source and provide the diffracted light to the projection optical element, and arranged to form a stereoscopic image in a multi-view by respectively focusing incident light on a plurality of different positions on the focal plane; and a spatial light modulator configured to form the stereoscopic image on the focal plane of the projection optical element according to the display data.

The interference pattern of the holographic optical elements may contain inverse aberration information which may offset an aberration of the projection optical element.

According to an aspect of another exemplary embodiment, an interactive three-dimensional (3D) display method includes: acquiring a hand image by detecting a hand of a user; generating a virtual object adjustment parameter by analyzing information about the hand based on the acquired hand image and comparing an analysis result with predefined user scenarios; generating image data by determining a scene according to the generated virtual object adjustment parameter and rendering the determined scene; and forming, on a 3D display, a 3D stereoscopic image including a virtual object in which a change intended by the user has been reflected according to the image data.

The generating of the virtual object adjustment parameter may include: analyzing a position, a shape, and a gesture of the hand from the acquired hand image; and generating the virtual object adjustment parameter by searching the predefined user scenarios and comparing the analysis result about the position, the shape, and the gesture of the hand with the predefined user scenarios.

The predefined user scenarios may be stored in a storage.

The generating of the image data may include: receiving the generated virtual object adjustment parameter and determining the scene based on virtual object data, a background of each object, and a motion of each object in the scene; acquiring image data by rendering the set scene; and a 3D image encoding operation of generating 3D display data, by digitizing the acquired image data, for displaying a 3D image including a virtual object in which a change intended by the user has been reflected, wherein the encoded display data may be input to the 3D display.

The determining of the scene may include displaying a scene boundary to prevent an object from disappearing outside the screen boundary, and the displaying of the scene boundary may include displaying a boundary cursor inside the screen, the boundary cursor being adjacent to the object, when the object moves outside the screen or holding the object not move outside the screen and displaying a holding state of the object.

When the virtual object is selected on the screen by using the hand of the user, the virtual object may be selected by matching the hand and the image with each other, displaying a hand-shaped cursor including dots and lines, or using a virtual string connecting the virtual object to the hand-shaped cursor.

BRIEF DESCRIPTION OF THE DRAWINGS

These and/or other exemplary aspects and advantages will become apparent and more readily appreciated from the following description of exemplary embodiments, taken in conjunction with the accompanying drawings in which:

FIG. 3 illustrates a table showing intentions of a user mapped to scenarios;

DETAILED DESCRIPTION

Figure 1:
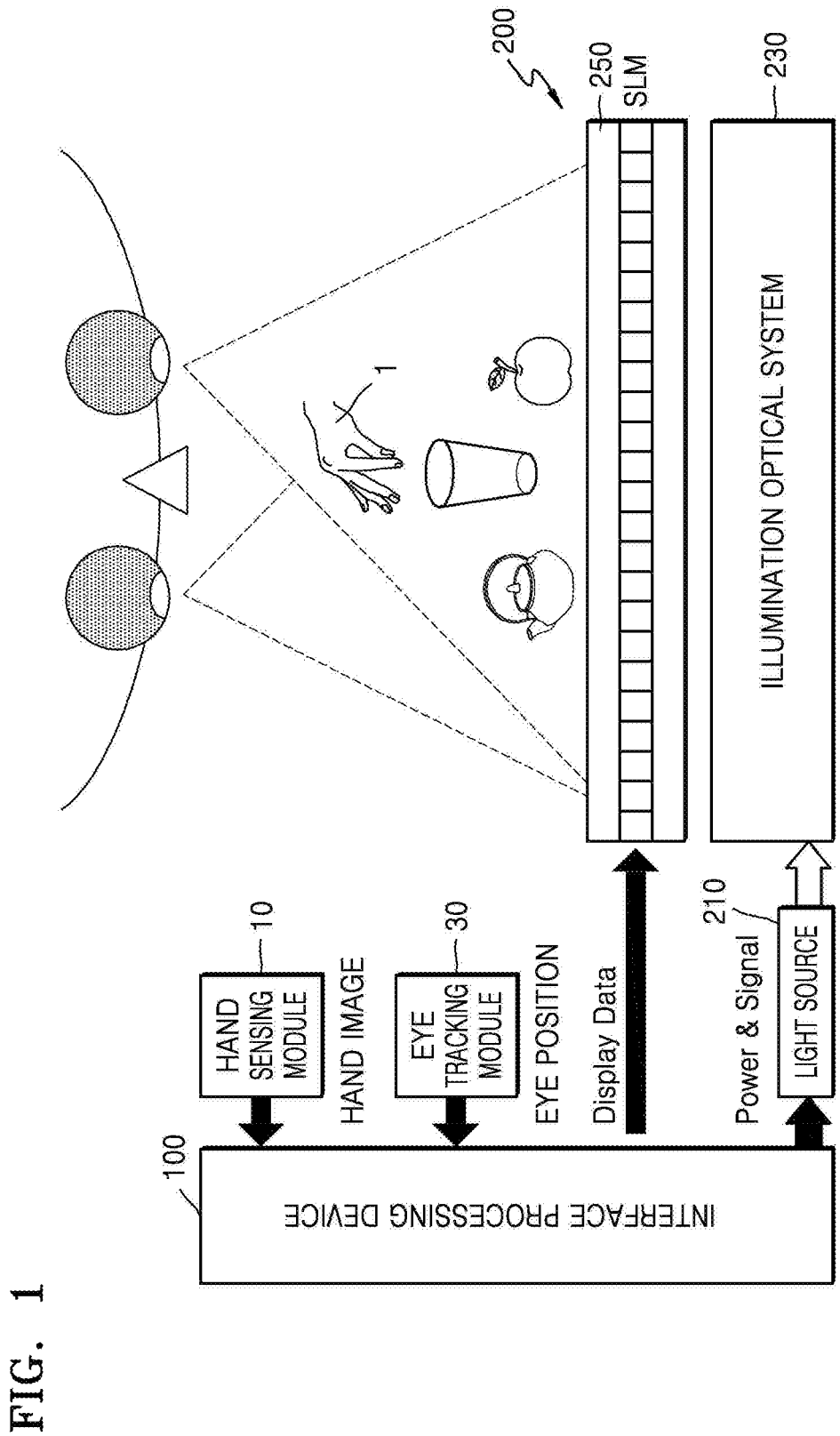
FIG. 1 illustrates an overall configuration of an interactive three-dimensional (3D) display apparatus according to an exemplary embodiment.

An interactive 3D display apparatus and method according to exemplary embodiments will now be described in detail with reference to the accompanying drawings. In the drawings, like reference numerals refer to like elements, and the sizes or thicknesses of components may be exaggerated for convenience of description. In this regard, the exemplary embodiments may have different forms and should not be construed as being limited to the descriptions set forth herein. Accordingly, the exemplary embodiments are merely described below, by referring to the figures, to explain aspects. As used herein, expressions such as "at least one of," when preceding a list of elements, modify the entire list of elements and do not modify the individual elements of the list.

The exemplary units and modules described herein may be implemented by software code stored in a non-transitory memory storage and implemented by a central processing unit (CPU) or other processor or computer. Alternately the exemplary units and modules described herein may be implemented by one or more dedicated hardware circuits.

Figure 2:
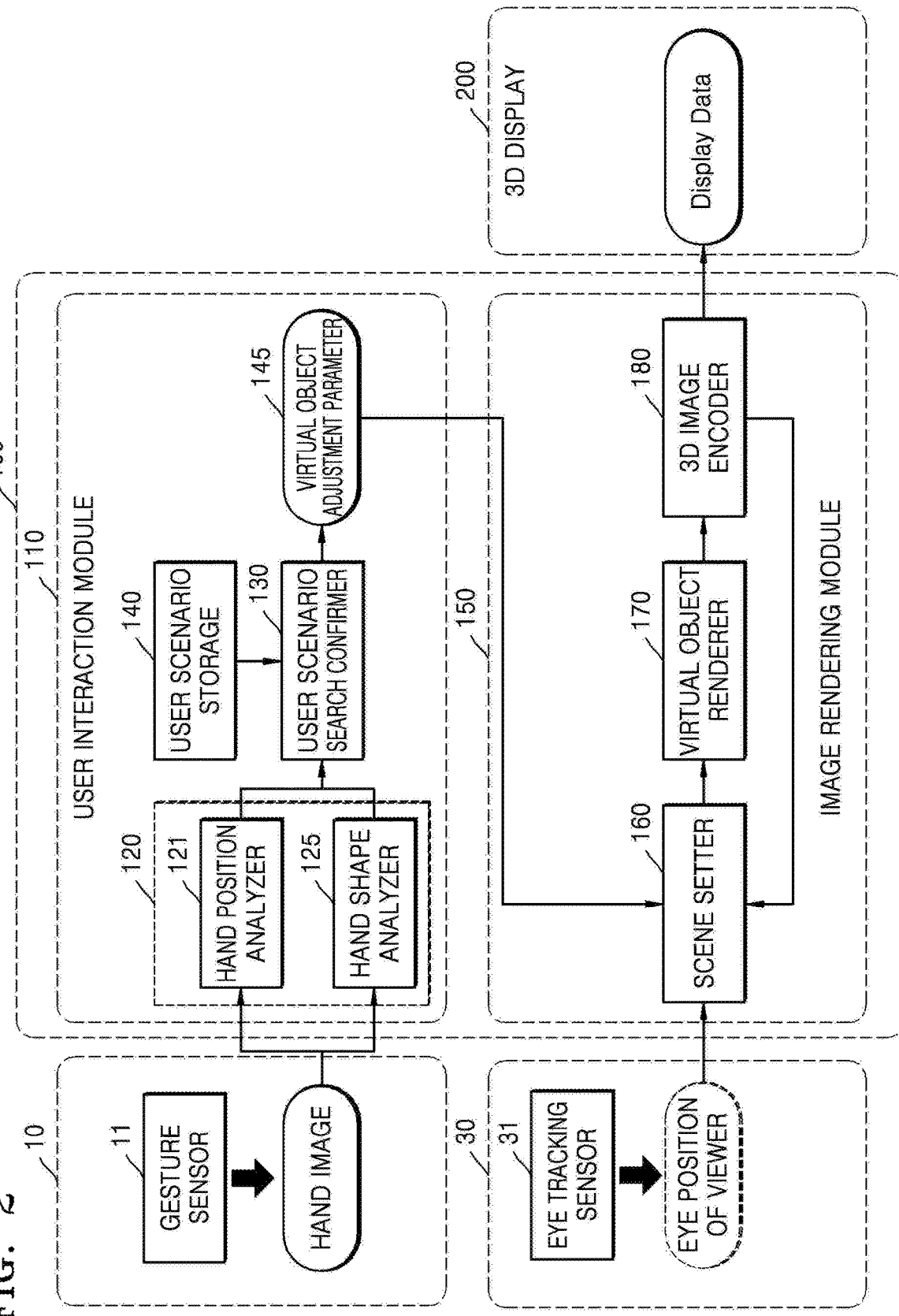
FIG. 2 illustrates a block diagram and a signal flow of the interactive 3D display apparatus according to an exemplary embodiment.

FIG. 1 illustrates an overall configuration of an interactive three-dimensional (3D) display apparatus according to an exemplary embodiment. FIG. 2 illustrates a block diagram and a signal flow of the interactive 3D display apparatus according to an exemplary embodiment.

Referring to FIGS. 1 and 2, the interactive 3D display apparatus according to an exemplary embodiment may include a hand sensing module 10 configured to detect a shape, a position, a motion, and the like of a hand 1 of a user, an interface processing device 100, and a 3D display configured to display a 3D image including a virtual object, a change in which, intended by a user, has been reflected according to image data. The interactive 3D display apparatus according to an exemplary embodiment may further include an eye tracking module 30 configured to confirm an eye position of a viewer. However, the interactive 3D display apparatus according to an exemplary embodiment may omit the eye tracking module 30.

The hand sensing module 10 may include a gesture sensor 11 and may acquire a hand image by detecting a position, a shape, and the like of the hand 1. The eye tracking module 30 may include an eye tracking sensor 31 configured to track an eye position of a viewer.

The interface processing device 100 may include a user interaction module 110, an image rendering module 150, and the like. The user interaction module 110 may analyze user-intended information about the hand 1 based on the hand image acquired by the hand sensing module 10 and generate a virtual object adjustment parameter by comparing an analysis result with a predefined user interface (UI) scenario. The image rendering module 150 may set a scene according to the virtual object adjustment parameter generated by the user interaction module 110, generate image data by rendering the set scene, and generate display data for a 3D display 200 from the generated image data.

Data collected through hardware such as the hand sensing module 10 and the eye tracking module 30 may be processed by the user interaction module 110 and the image rendering module 150 and reflected to an image to be displayed on the 3D display 200. When the 3D display 200 includes the eye tracking module 30, the hardware configured to collect data may include the eye tracking module 30 and the like besides the hand sensing module 10 configured to detect a position, a shape, and the like of the hand 1. FIGS. 1 and 2 show an example in which the eye tracking module 30 is applied to the interactive 3D display apparatus according to an exemplary embodiment to adjust a scene set by a scene setter 160 according to positions of the eyes of the user. As another example, the interactive 3D display apparatus according to an exemplary embodiment may be implemented omitting the eye tracking module 30. Hereinafter, a case of applying the eye tracking module 30 to the interactive 3D display apparatus according to an exemplary embodiment is described as an example.

The user interaction module 110 may analyze a position, a shape, a motion, and the like of the hand 1 by using the hand image acquired by the hand sensing module 10. In addition, the user interaction module 110 may compare the hand image analysis result with predefined user scenarios to perceive an intention of a viewer/user and generate a virtual object adjustment parameter. To this end, the user interaction module 110 may include a hand position/shape analyzer 120 and a user scenario search confirmer 130.

Referring to FIG. 2, the user interaction module 110 may include the hand position/shape analyzer 120 to analyze a position, a shape, a motion, and the like of the hand 1 by using a hand image. The hand position/shape analyzer 120 may include a hand position analyzer 121 and a hand shape analyzer 125. The hand position/shape analyzer 120 may have an integrated structure including the hand position analyzer 121 and the hand shape analyzer 125. In addition, the user interaction module 110 may include the user scenario search confirmer 130 configured to generate a virtual object adjustment parameter by searching the user scenarios and comparing the result analyzed by the hand position/shape analyzer 120 with the user scenarios. The user interaction module 110 may include a user scenario storage 140 configured to store the user scenarios, or the user scenarios may be stored in a separately provided storage. FIG. 2 illustrates a case wherein the user interaction module 110 includes the user scenario storage 140.

The hand position/shape analyzer 120 may parameterize at least one of a hand shape, a hand motion, and a hand moving speed by confirming a position of a hand or fingers from a hand image acquired by the hand sensing module 10 and recognizing a shape of each finger. For example, the hand position/shape analyzer 120 may confirm a position of a hand or fingers and recognize shape of each finger by analyzing a hand image acquired by the hand sensing module 10 and parameterize a grab, release shape, a hand-moving speed through comparison with a previous position and the like. The analysis result of the hand position/shape analyzer 120 may be transmitted to the user scenario search confirmer 130.

As such, a gesture parameterized, and thus identified, by the hand position/shape analyzer 120 may be used to perceive an intention of the user by being compared with the predefined user scenarios by the user scenario search confirmer 130. The predefined user scenarios may be designed so as to have similar feeling to that of dealing with an actual object instead of a 3D image.

FIG. 3 illustrates a table showing intentions of a user mapped to scenarios. As shown in FIG. 3, an intention of the user, which has been confirmed by being compared with predefined user scenarios, is transmitted to the scene setter 160 of the image rendering module 150 to form a new scene including an object in which a change is reflected.

Referring to FIG. 3, for example, "select" may be represented by changing a state of releasing fingers to a state of grabbing in which two or more fingers, including the thumb, are closed. "Translation motion" may be represented by moving a hand in a "select" state. A "throw & stop" motion for moving a virtual object in a hand-moving direction may be represented by releasing the hand in the middle of moving the virtual object by the hand in the "select" state, and then completely releasing the hand. A "scale" adjustment may be represented by adjusting a distance between two hands in the select state. "Rotation" may be represented by moving two fisted hands in different directions. "On screen menu" may be represented by holding up an index finger. "Menu selection" may be represented by swiping a finger on a menu or a text of the menu. "OK & cancel" may be represented by holding a thumb up or down. The user scenarios shown in FIG. 3 are only illustrative, and the present exemplary embodiment is not limited thereto, and the user scenarios applied to the interactive 3D display apparatus according to an exemplary embodiment may be modified in any of various ways according to used content or applications.

Referring back to FIG. 2, the image rendering module 150 may include the scene setter 160, a virtual object renderer 170, and a 3D image encoder 180.

The scene setter 160 may receive a virtual object adjustment parameter 145 generated by the user scenario search confirmer 130 and set a scene in consideration of virtual object data, a background of each object, and a motion of each object. The scene setter 160 may receive eye position data of a viewer, which has been acquired by the eye tracking module 30. The scene setter 160 may set a scene in consideration of the eye position data of the viewer.

For the 3D display 200, an object may move outside a screen and thus not be visible according to a position of the viewer or during the use of a UI, and thus an additional scenario for preventing or responding to this situation is desired.

According to the interactive 3D display apparatus according to an exemplary embodiment, the scene setter 160 may include a scene boundary function to prevent an object from disappearing outside a boundary of the screen by a control of the user. The scene boundary function may be implemented by a boundary cursor or an object hold function for prohibiting movement of an object when a boundary portion of the object overlaps an edge of the screen.

Figure 4A:
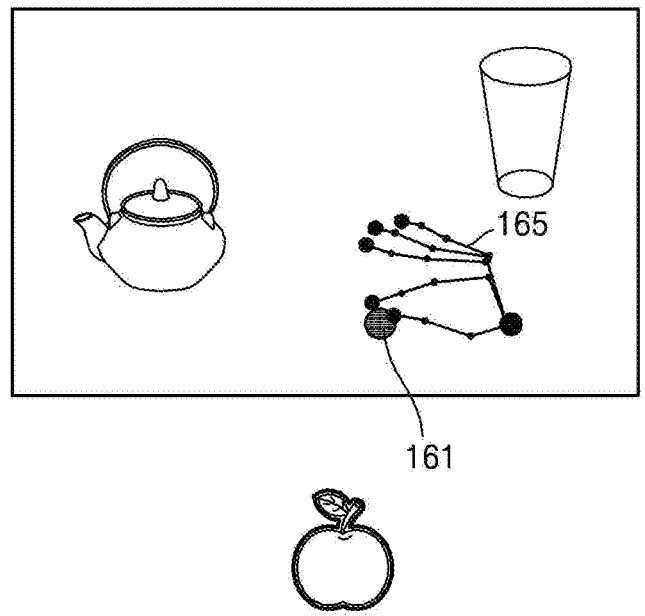
FIG. 4A illustrates a case of displaying a boundary cursor in a dot shape inside a screen, the boundary cursor being closest to an object which has moved outside the screen.

For example, when an object has moved outside the screen, the scene setter 160 may display a boundary cursor indicating that an object exists in the move-out direction by displaying a dot or a polygon at the inside of the screen, which is closest to the object. FIG. 4A illustrates a case of displaying a boundary cursor in a shape of a dot 161 in a screen, being closest to an object which has moved outside the screen. As such, when the boundary cursor 161 is displayed, the boundary cursor 161 may be manipulated using the user interaction module 110 to control the object outside the screen.

Figure 4B:
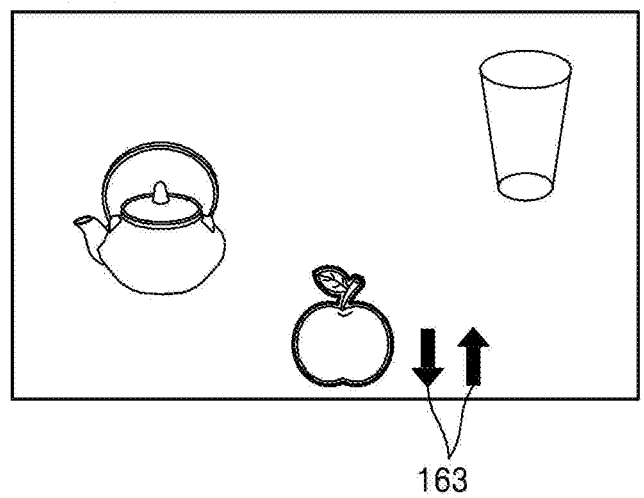
FIG. 4B illustrates a case of displaying, as an arrow, a state of holding an object so as not to move outside the screen anymore.

As another example, when an object which is supposed to be displayed on the screen is going to be moved outside the screen, the scene setter 160 may make the object remain within the screen through an operations which has an effect of creating a type of virtual wall on the screen, or when a boundary portion of an object overlaps an edge of the screen, the scene setter 160 may hold the object so as to prevent a movement of the object further outside the screen. FIG. 4B illustrates a case of displaying, as an arrow 163, a state of holding an object so as not to prevent movement of the object further outside the screen.

A virtual object image formed by the interactive 3D display apparatus according to an exemplary embodiment may be located between the viewer (user) and the screen of the 3D display 200 or may be displayed far from the screen. As such, according to a 3D display characteristic, an image representable region is greater than a hand touchable range.

Therefore, when a virtual object is selected, a complete matching between a hand and the virtual object may be limited. In addition, when the hand is located inside the screen, the selection of the virtual object is relatively intuitive and has sense of reality, but the hand may hide the screen.

By taking into account this situation, the scene setter 160 may set a scene such that a cursor indicating a shape and a position of a hand on the screen is used. To display a shape and a position of a hand as a cursor on the screen, the scene setter 160 may receive information about a shape, a position, a motion, and the like of the hand, which has been acquired from the hand position/shape analyzer 120. The information about a shape, a position, a motion, and the like of the hand may be input to the scene setter 160 through the user scenario search confirmer 130 or directly input to the scene setter 160 from the hand position/shape analyzer 120. In FIG. 2, a path through which the information about a shape, a position, a motion, and the like of the hand, which has been acquired from the hand position/shape analyzer 120, is input to the scene setter 160 is omitted.

The cursor may be displayed as a hand image cursor having the same shape as the hand shape acquired by the hand position/shape analyzer 120 or a hand-shaped cursor (see 165 of FIG. 4A) including dots and lines. Even when a hand and a virtual object match each other, the cursor may be used to prevent an error in use.

As described above, the scene setter 160 may set a scene when a virtual object is selected such that the virtual object is selected in a method of matching a hand and the object or by using the hand image cursor or the hand-shaped cursor 165 including dots and lines.

When a scene is set such that a virtual object is selected by matching a hand and the virtual object, the hand may be used as a cursor. Herein, even when the hand and the object are possibly matched, a scene may be set such that the virtual object is selected using the cursor by displaying a hand-shaped cursor on the screen to prevent an error. Even in this case, the cursor may be a hand image cursor or a hand-shaped cursor including dots and lines.

In addition, when a hand and an image are in different regions, a scene may be set such that a virtual object is selected using a hand-shaped cursor. In this case, the scene setter 160 may set a scene so as to display a hand-shaped cursor on the screen or to connect the hand-shaped cursor and the virtual object by using, for example, a virtual string according to information about a position and a shape of a hand, which has been obtained by the hand position/shape analyzer 120. In this case, the hand-shaped cursor may be a hand image cursor or a cursor including dots and lines and shaped like a hand.

As described above, according to the interactive 3D display apparatus according to an exemplary embodiment, the scene setter 160 may set a scene so as to select a virtual object by selecting a direct control method or an indirect control method according to a position of the virtual object.

That is, a scene may be set so as to select a virtual object by matching a hand and the virtual object in a near-distance directly control method or to select the virtual object in an indirect control method using a cursor. In this case, the cursor may be a hand image detected by the gesture sensor 11 or may be formed by connecting dots and lines in the same hand shape as the hand image.

The scene setter 160 may set a scene such that a tool for selecting a virtual object is automatically selected according to a position of the virtual object by using information about a position and a shape of a hand, which has been obtained by the hand position/shape analyzer 120.

For example, when a hand and an image are possibly matched, the hand may function as a cursor, and thus a tool for selecting a virtual object may be the hand, and the virtual object may be selected in a near-distance control method.

In addition, when the hand and the image are located in different regions instead of matching the hand and the image, a scene may be set such that a virtual object is selected using a hand-shaped cursor.

In addition, when an image is represented far from the screen by the 3D display 200 such that a hand and the image are located in different regions, thereby making difficult a direct interaction between the hand and the image, a scene may be set such that a virtual string is used to connect a virtual object and a hand-shaped cursor.

As such, when the hand and the image are located in different regions, a tool for selecting the virtual object may be the hand-shaped cursor, and the virtual object may be selected in a far-distance indirect control method.

As described above, the scene setter 160 may be configured to automatically determine whether to select a virtual object in a method of matching a hand and the object when the hand and the object are located in the same region or to use a cursor in a virtual object selection when the hand and the object are located in different regions or when a distance between the hand and the object is far, according to a position of the virtual object.

To this end, the scene setter 160 may first determine whether a hand and an object are matched from information about a position and a shape of the hand, which has been obtained by the hand position/shape analyzer 120, and then determine a tool for selecting a virtual object according to whether the hand and the object are matched.

Figure 5:
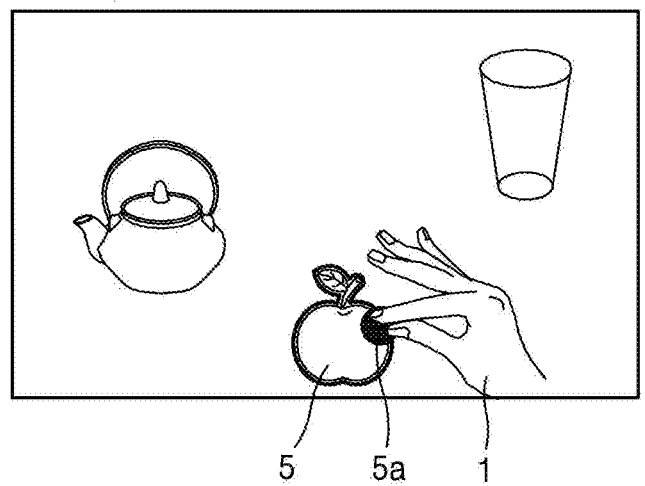
FIG. 5 illustrates an example of displaying a hand and an image to be matched with each other in order to select a virtual object via the hand.

FIG. 5 illustrates an example of selecting a virtual object 5 by the hand 1 since the hand 1 and an image are matched.

As shown in FIG. 5, when the hand 1 and the virtual object 5 are matched, whether the virtual object 5 is selected may be indicated by, for example, highlighting an outline of the selected virtual object 5 or adjusting a tone of the selected virtual object 5. In addition, accuracy of an interaction may be increased by displaying a polygon or closed curve of a different color at a portion 5a where the selected virtual object 5 and the hand 1 meet. FIG. 5 shows an example of indicating a selection by highlighting the portion 5a where the selected virtual object 5 and the hand 1 meet.

Figure 6:
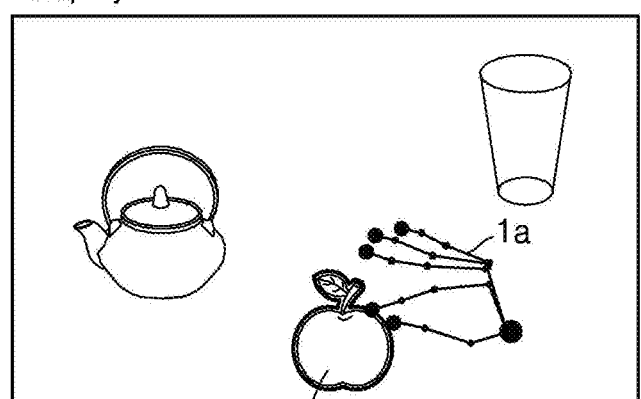
FIG. 6 illustrates an example of selecting a virtual object by using a hand-shaped cursor when a hand and an image are located in different regions.

FIG. 6 illustrates an example of selecting the virtual object 5 by using a hand-shaped cursor 1a including dots and lines when the hand 1 and an image are located in different regions. As shown in FIG. 6, when the hand 1 and the image re located in different regions, the hand-shaped cursor 1a including dots and lines or the like may be used. In this case, the hand-shaped cursor 1a may include dots and lines so as for the user to perceive a shape and a position of the hand 1. Even when the hand-shaped cursor 1a including dots and lines is used, whether the virtual object 5 is selected may be indicated by highlighting the outline of the selected virtual object 5 or adjusting a tone of the selected virtual object 5. In addition, accuracy of an interaction may be increased by displaying a polygon or closed curve of a different color at a portion where the selected virtual object 5 and the hand-shaped cursor 1a meet. Although FIG. 6 shows that the hand-shaped cursor 1a includes dots and lines, the hand-shaped cursor 1a may include a hand image or modified in various other forms. In addition, a cursor position may be represented so as to represent two or more hand shapes among fist, grab, release, and the like.

Figure 7:
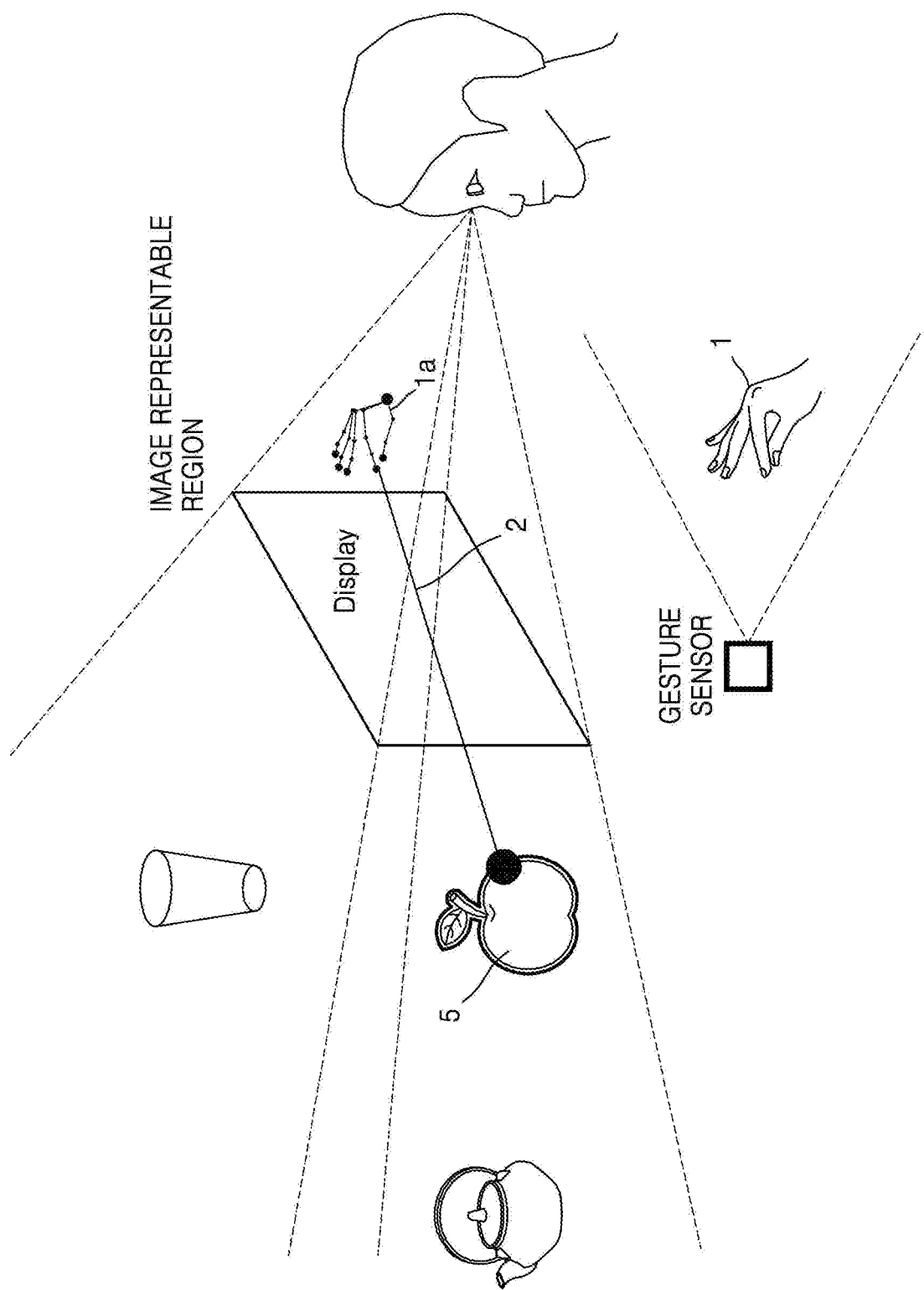
FIG. 7 illustrates an example of selecting a virtual object by using a virtual string connecting a virtual object to a hand-shaped cursor.

The 3D display 200 may represent an image to be displayed in a front direction of the screen and, according to circumstances, represent an image to be displayed far from the screen in a rear direction. However, in the latter case, a direct interaction between the hand 1 and the image is difficult. In the cases, a cursor may be used, but when an image is very far apart from the screen, a direct interaction between the hand 1 and the image only with the cursor may be difficult. In this case, as shown FIG. 7, a scene may be set such that the virtual object 5 is selected using a virtual string 2 or the like connecting the virtual object 5 to the hand-shaped cursor 1a. FIG. 7 illustrates an example of selecting the virtual object 5 by using the virtual string 2 connecting the virtual object 5 to the hand-shaped cursor 1a. In FIG. 7, the hand-shaped cursor 1a may include a hand image or modified in various forms instead of including dots and lines.

As described above, according to the interactive 3D display apparatus according to an exemplary embodiment, by comparing and analyzing a sensing result of a position, a shape, and a motion of a hand with UI scenarios according to a position of an object, a virtual object is selected by a near-distance direct control when the hand and an image are matched, or selected by a cursor or a method of connecting to the cursor by using a virtual string when the hand and the image are located in different regions.

Referring back to FIG. 2, the virtual object renderer 170 may acquire image data by rendering a scene set by the scene setter 160. The image data acquired by the virtual object renderer 170 may be rendered to at least one sheet of 2D image data or depth data. In addition, 3D input data input to the virtual object renderer 170 to acquire image data may be voxel data, color and depth image data, 3D mesh data, or the like. as such, the 3D input data input to the virtual object renderer 170 to acquire image data may be readjusted to meet optical characteristics of the 3D display.

The 3D image encoder 180 may generate 3D display data, by digitizing the image data acquired by the virtual object renderer 170, for displaying a 3D image including a virtual object in which a change intended by the user has been reflected.

The generated 3D display data may be transmitted to the 3D display 200 and represented via a spatial light modulator (SLM) 250 as a 3D image including a virtual object for which a change, intended by the user, has been reflected.

Referring back to FIG. 1, the 3D display 200 may include the SLM 250 and a lighting unit for emitting light to the SLM 250. The lighting unit may include a light source 210 and an illumination optical system 230 for magnifying the light emitted from the light source 210 to illuminate over an entirety of the SLM 250. The light emitted from the light source 210 may be magnified by the illumination optical system 230 and spread to a larger area than a size of the SLM 250. The SLM 250 includes a plurality of pixels and controls brightness and a phase of each pixel to implement a 3D image, and these values may be calculated in advance by the interface processing device 100 described above. Display data calculated by the interface processing device 100 may be input to operate the SLM 250.

The SLM 250 may be a phase modulator for modulating a phase of incident light, an amplitude modulator for modulating a brightness of incident light, or a hybrid modulator for modulating both a phase and a brightness of incident light. Light modulated by the SLM 250 may form a stereoscopic image at a certain spatial position through the use of both diffraction and interference.

The SLM 250 may display a 3D image including a virtual object for which a change, intended by the user, has been reflected, by operating according to display data.

To implement the interactive 3D display apparatus according to another exemplary embodiment, a holographic 3D display 200 for implementing, for example, both a binocular depth cue and accommodation may be applied as the 3D display 200. Besides, to implement the interactive 3D display apparatus according to another exemplary embodiment, a binocular 3D display, a light-field 3D display, or the like may be applied as the 3D display 200.

Figure 8:
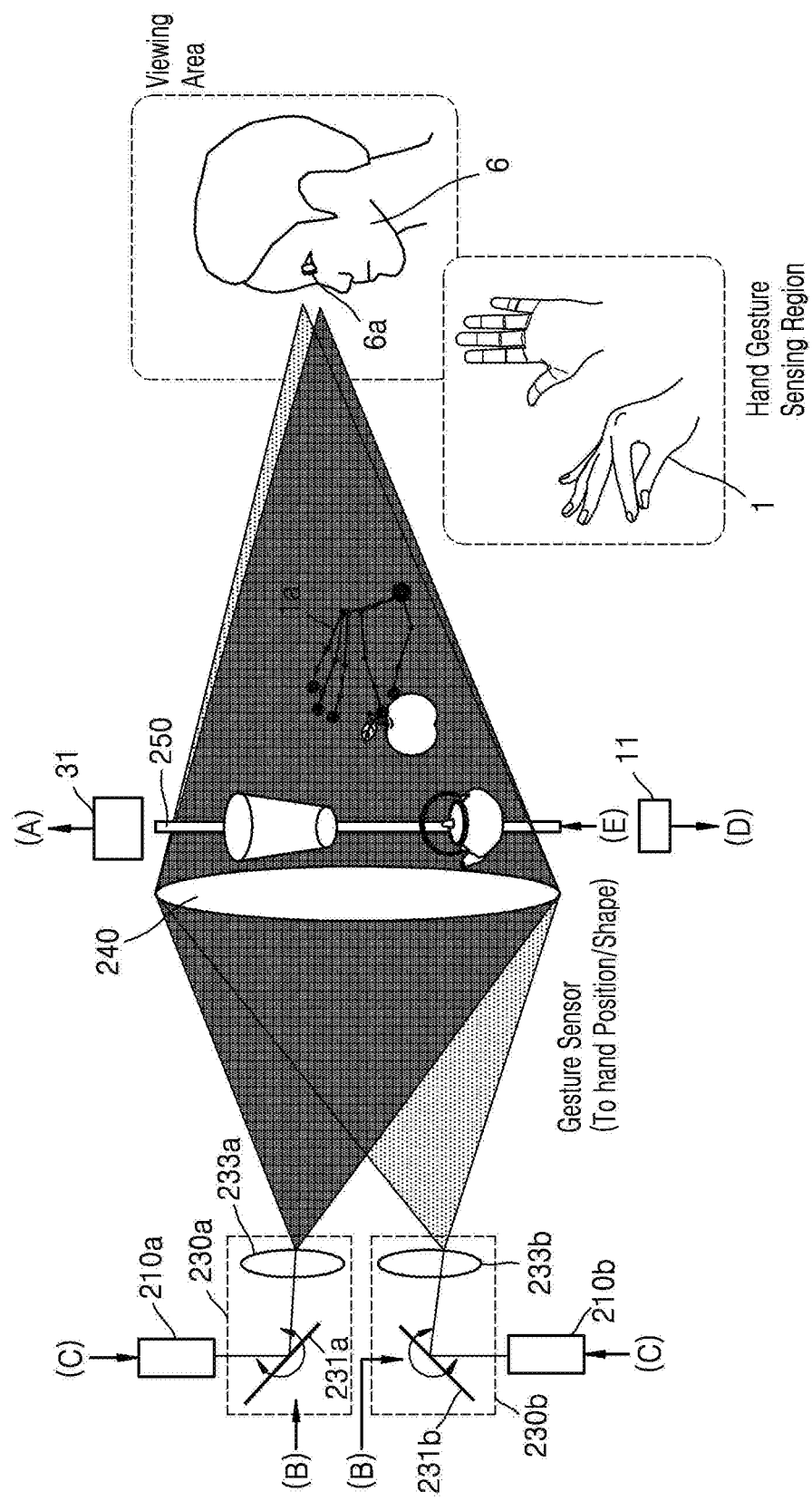
FIG. 8 illustrates an optical configuration when a holographic 3D display is applied to the interactive 3D display apparatus, according to an exemplary embodiment.
Figure 9:
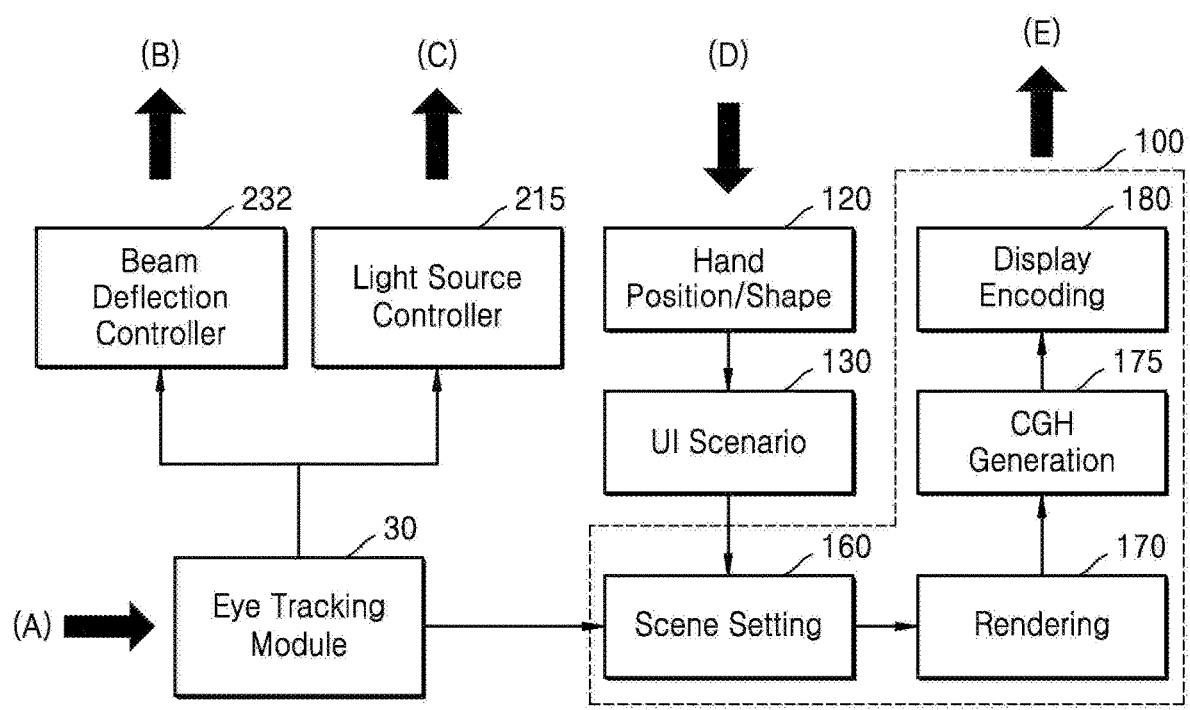
FIG. 9 illustrates a block diagram of a system configuration for implementing the interactive 3D display apparatus having the optical configuration of FIG. 8, according to an exemplary embodiment.

FIG. 8 illustrates an optical configuration when the holographic 3D display 200 is applied to the interactive 3D display apparatus, according to an exemplary embodiment, and FIG. 9 illustrates a block diagram of a system configuration for implementing the interactive 3D display apparatus employing the optical configuration of FIG. 8, according to an exemplary embodiment. FIG. 8 illustrates an example in which the interactive 3D display apparatus according to an exemplary embodiment is implemented to reduce a calculation amount by tracking an eye position of the user while using the holographic 3D display 200.

Referring to FIGS. 8 and 9, the interactive 3D display apparatus according to an exemplary embodiment may include the eye tracking sensor 31, the 3D display 200, the gesture sensor 11, and the like. In addition, the interactive 3D display apparatus according to an exemplary embodiment may include the eye tracking module 30 including the eye tracking sensor 31, the hand sensing module 10 including the gesture sensor 11, and the interface processing device 100. The eye tracking sensor 31 is configured to orient to a face of the viewer in a viewing area, and data A acquired using the eye tracking sensor 31 may be analyzed by the eye tracking module 30 and used to confirm an eye position of the user.

As shown in FIG. 8, the 3D display 200 may include, for example, the lighting unit and the SLM 250. In addition, the 3D display 200 may further include a field lens 240 between the lighting unit and the SLM 250. The lighting unit may include, for example, a left-eye lighting unit and a right-eye lighting unit. The left-eye lighting unit may include a left-eye light source 210*a* and a left-eye illumination optical system 230*a*, and the left-eye illumination optical system 230*a* may include a left-eye beam deflector 231*a* and a first illumination lens 233*a*. The right-eye lighting unit may include a right-eye light source 210*b* and a right-eye illumination optical system 230*b*, and the right-eye illumination optical system 230*b* may include a right-eye beam deflector 231*b* and a second illumination lens 233*b*.

The left-eye light source 210*a* and the right-eye light source 210*b*, respectively, emit left-eye illumination light and right-eye illumination light according to a control signal C of a light source controller 215. A beam deflection controller 232 may control directions of light emitted from the left-eye light source 210*a* and the right-eye light source 210*b* by controlling the left-eye beam deflector 231*a* and the right-eye beam deflector 231*b* based on eye position data acquired by the eye tracking module 30. The left-eye beam deflector 231*a* and the right-eye beam deflector 231*b* respectively adjusts proceeding directions of the left-eye illumination light and right-eye illumination light according to a control signal B of the beam deflection controller 232. Directions of the left-eye illumination light and right-eye illumination light may be changed and sizes of the left-eye illumination light and right-eye illumination light may be magnified so as to illuminate the SLM 250 through optical elements such as the first illumination lens 233*a* and the second illumination lens 233*b*. An f-theta lens or the like may be provided as the first illumination lens 233*a* and the second illumination lens 233*b*, and besides, various types of lenses capable of making desired illumination light may be applied thereto. Light magnified by the first illumination lens 233*a* and the second illumination lens 233*b* may be adjusted to be focused in an eye direction through the field lens 240.

The SLM 250 operates according to input display data E to form a stereoscopic image, and this formed stereoscopic image is picked up by eyes 6*a* of a viewer 6 within a viewing area.

In this case, the gesture sensor 11 transmits, to the hand position/shape analyzer 120, a hand image D generated by detecting a position and a shape of the hand 1 in a hand gesture sensing region. For the gesture sensor 11, a complementary metallic oxide semiconductor (CMOS) image sensor, a time-of-flight (ToF) depth sensor or the like may be used.

The hand position/shape analyzer 120 may parameterize a grab and release shape of the fingers, a hand-moving speed through comparison with a previous position, and the like by confirming a position of the hand 1 or fingers and recognizing a shape of each finger, and this parameterized hand gesture may be compared with predefined UI scenarios by the scenario search confirmer 130, thereby determining an intention of the user. This determined intention of the user may be transmitted to the scene setter 160, and an eye tracking result may also be transmitted to the scene setter 160, such that the determined intention of the user and the eye tracking result are used to set a scene. The set scene may be rendered by the virtual object renderer 170 and acquired as image data, and the image data may be input to a holographic data generator 175. The holographic data generator 175 may generate holographic data (CGH generation) from the input image data, and the 3D image encoder 180 may generate display data E for forming a 3D holographic stereoscopic image by performing encoding for generating the display data E (display encoding). This generated display data E may be input to the SLM 250 to form a holographic stereoscopic image for which a motion of an object has been reflected according to an intention of the user, thereby being viewed to the eye 6*a* of the viewer 6.

As shown in FIGS. 8 and 9, when a holographic display is used for the 3D display 200 display, the holographic data generator 175 configured to generate holographic data from rendered image data may be further provided to obtain display data to be input to the SLM 250 such that a holographic stereoscopic image is formed. In addition, when an eye position of the user is tracked to reduce a calculation amount, the eye tracking sensor 31 and the eye tracking module 30 including the same may be further provided, and the beam deflection controller 232 and the beam deflectors 231*a* and 231*b* may be further provided to adjust an illumination light emission direction according to the tracked eye position. Although FIGS. 8 and 9 show that the data A of the eye tracking sensor 31 is input to the eye tracking module 30, the eye tracking sensor 31 may be included in the eye tracking module 30. As another example, the eye tracking module 30 may include only a processor for calculating an eye position from the data A input from the eye tracking sensor 31.

As known from comparison between FIGS. 2 and 9, the holographic data generator 175 may be provided between the virtual object renderer 170 and the 3D image encoder 180. The holographic data generator 175 may be included in the virtual object renderer 170 or the 3D image encoder 180.

Although a case in which the 3D display 200 applied to the interactive 3D display apparatus according to an exemplary embodiment is provided to form an image for a left eye and an image for a right eye has been described and shown with examples, various 3D displays may also be applied.

For example, a 3D display for forming a multi-view image may be applied to the interactive 3D display apparatus according to an exemplary embodiment.

Figure 10:
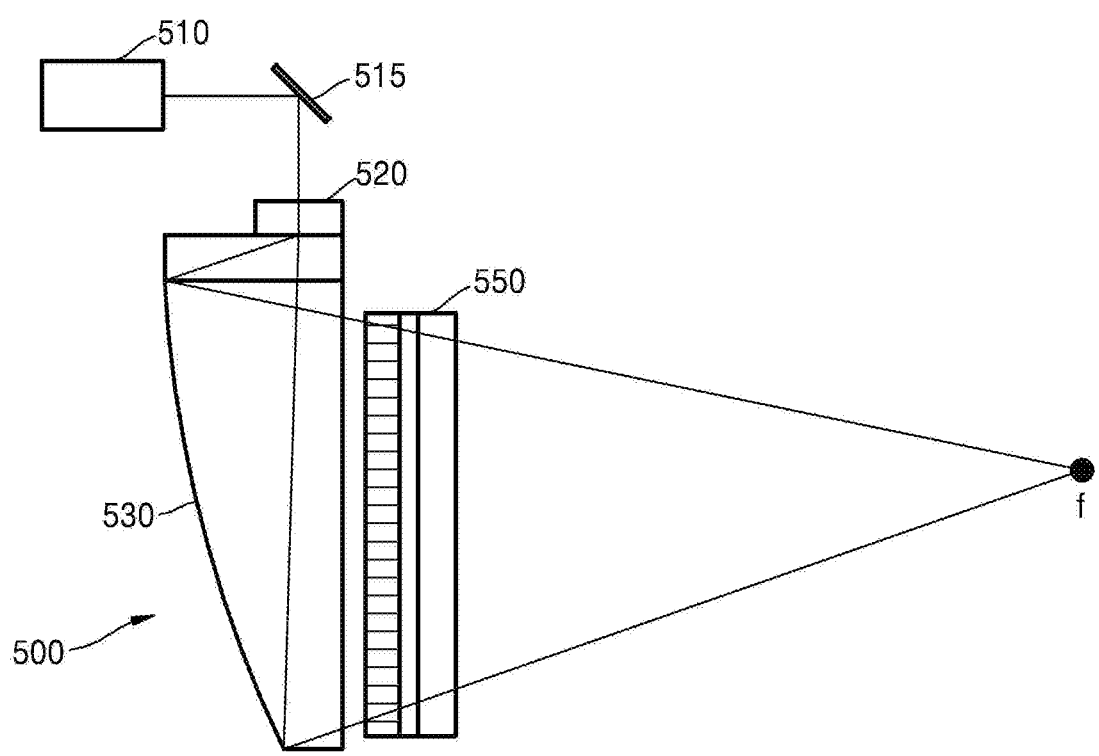
FIG. 10 illustrates a side view of a 3D display applied to the interactive 3D display apparatus, according to another exemplary embodiment.
Figure 11:
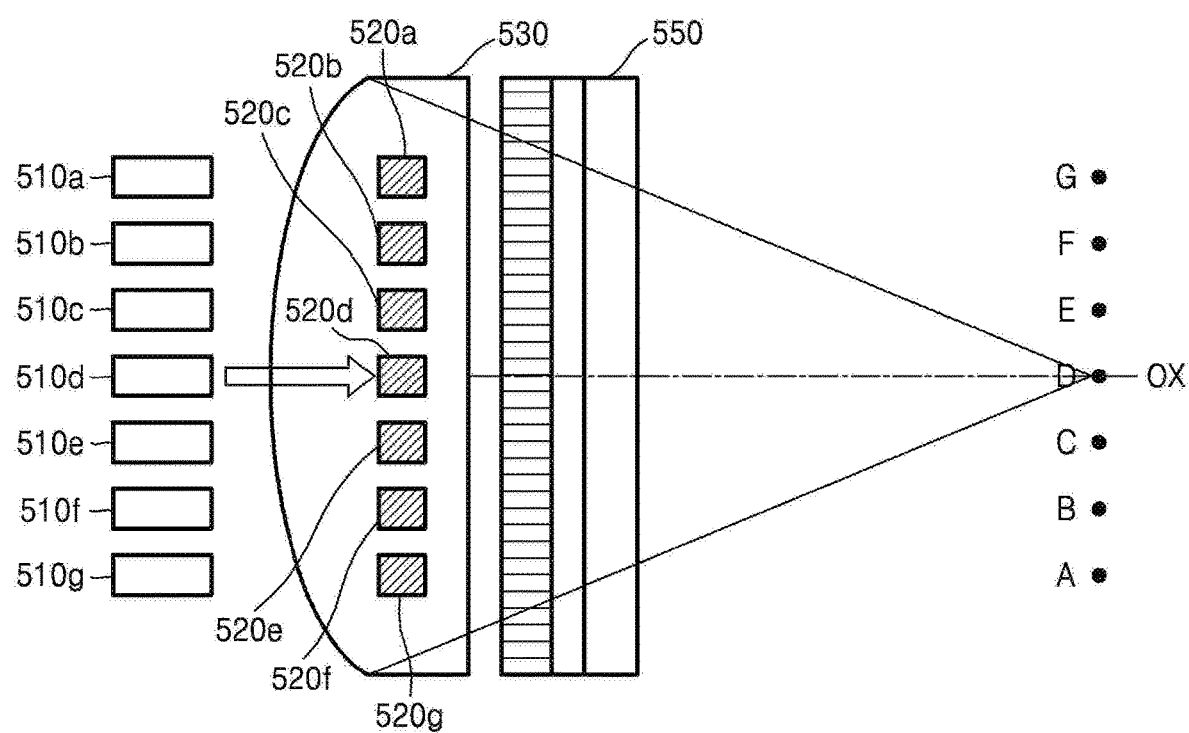
FIG. 11 illustrates a top view of the 3D display of FIG. 10.
Figure 12A:
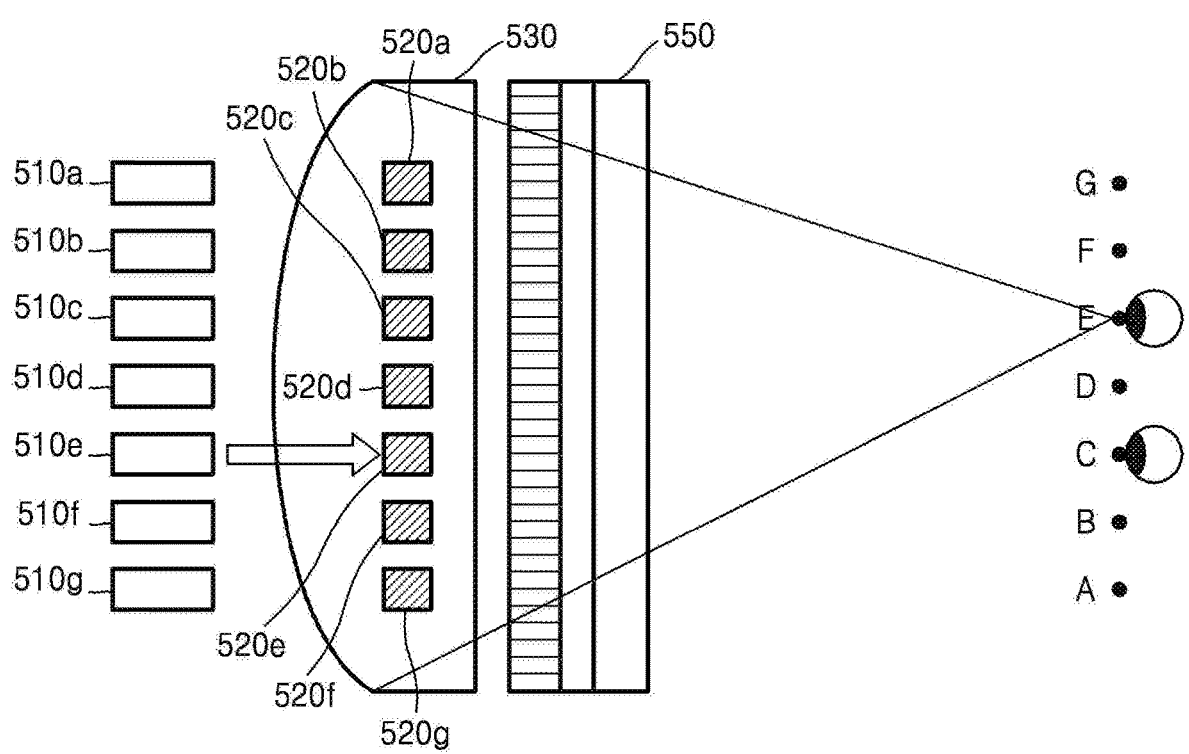
FIGS. 12A and 12B illustrate top views for describing an operation of the 3D display of FIG. 11.
Figure 12B:
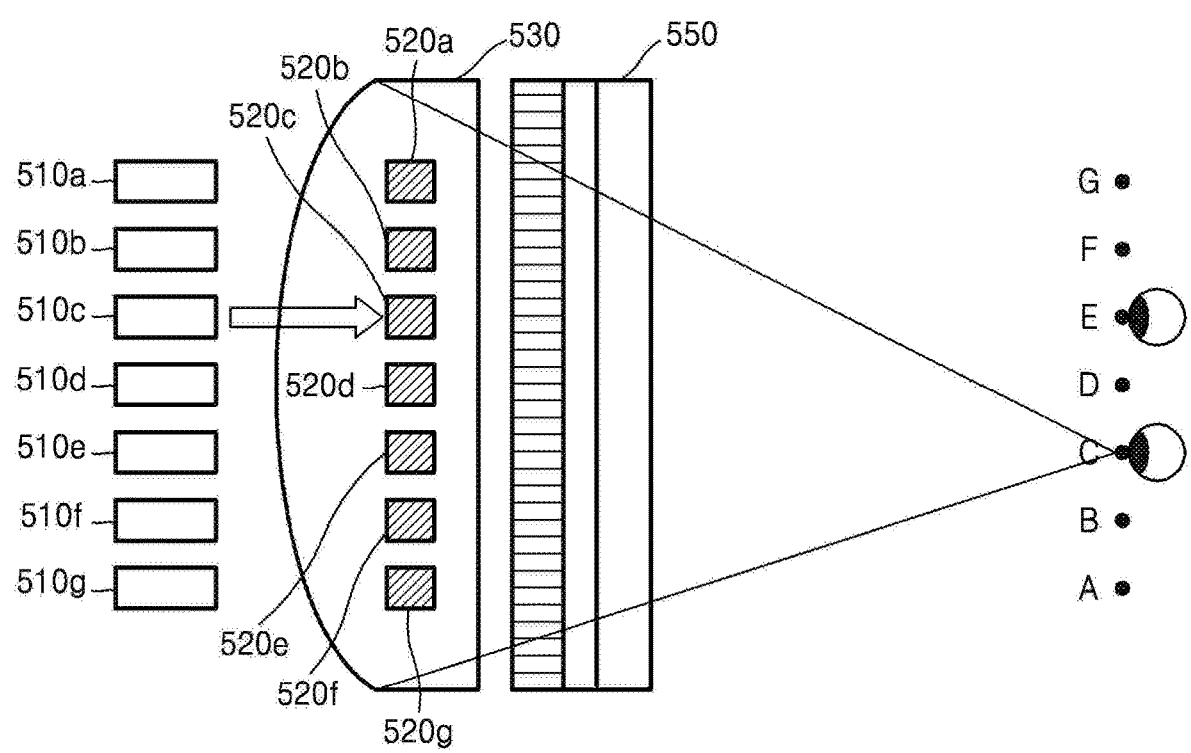

FIG. 10 illustrates a side view of a 3D display 500 which is applicable to the interactive 3D display apparatus, according to another exemplary embodiment. FIG. 11 illustrates a top view of the 3D display 500 of FIG. 10. FIGS. 12A and 12B illustrate top views for describing an operation of the 3D display 500 of FIG. 11.

Referring to FIGS. 10 and 11, the 3D display 500 according to the present exemplary embodiment may include a light source 510, a projection optical element 530, a holographic optical element (HOE) 520, and an SLM 550.

For the light source 510, a coherent light source, such as laser, may be provided. The projection optical element 530 focuses light emitted from the light source 510. The HOE 520 may be disposed between the light source 510 and the projection optical element 530. The SLM 550 may modulate incident light such that a stereoscopic image is formed at a certain spatial position. The light source 510, the HOE 520, and the projection optical element 530 may constitute a lighting unit.

The projection optical element 530 may be, for example, an oval mirror having a concave reflection surface. Herein, another optical element such as a refraction lens or a diffraction lens may be used for the projection optical element 530. In the exemplary embodiment of FIG. 10, the projection optical element 530 may focus light on a focal plane f. Herein, the projection optical element 530 may be configured to convert the light emitted from the light source 510 into parallel beam, and a focusing projection optical element may be further provided to focus the parallel beam on a focal plane. In this case, a general refraction lens, a Fresnel lens, a holographic lens, or the like may be applied as the focusing projection optical element.

The HOE 520 may have an interference pattern formed to diffract the light emitted from the light source 510, for example, a coherent light source, and to provide the diffracted light to the projection optical element 530. The interference pattern of the HOE 520 may contain inverse aberration information by which an aberration of the projection optical element 530 may be offset, thereby improving a quality of an image formed by the SLM 550. For example, the light emitted from the light source 510 may be incident on an upper surface of the HOE 520 via a plane mirror. Thereafter, light diffracted by the interference pattern formed inside the HOE 520 may be output through a lower surface of the HOE 520. Since the diffracted light has an aberration that is opposite to the aberration of the projection optical element 530, when the diffracted light is focused on the focal plane f by the projection optical element 530, the diffracted light may have no aberration.

To deliver the light emitted from the light source 510 to the HOE 520, another light delivery means such as a prism or an optical fiber may be used instead of the plane mirror, or the light source 510 may be disposed such that the light emitted from the light source 510 is directly delivered to the upper surface of the HOE 520.

Although only one HOE 520 is shown in the side view of FIG. 10, a plurality of HOEs may be arranged according to the number of view-points of a stereoscopic image to be provided by the 3D display 500 as shown in FIG. 11.

Referring to FIG. 11, a plurality of HOEs 520a through 520g may be arranged on the projection optical element 530 in a direction that is perpendicular to an optical axis OX of the projection optical element 530. In addition, a plurality of light sources 510a through 510g may be arranged in correspondence with the plurality of HOEs 520a through 520g, respectively. The number of HOEs 520a through 520g may be the same as the number of view-points of a stereoscopic image to be provided by the 3D display 500. Although FIG. 11 shows first to seventh HOEs 520a through 520g and first to seventh light sources 510a through 510g as an example, the present exemplary embodiment is not limited thereto, and the number of HOEs 520 and the number of light sources 510 may vary according the desired number of view-points. Alternatively, only one HOE may be used regardless of the desired number of view-points. For example, only a single HOE extending long in the direction that is perpendicular to the optical axis OX may be used.

Only a single light source may be used instead of the plurality of light sources 510a through 510g. For example, one light beam may be split into a plurality of light beams by using a beam splitter or the like and provided to the plurality of HOEs 520a through 520g. In this case, an optical shutter configured to control the transmission or blocking of light may be disposed on a light incident surface of each of the plurality of HOEs 520a through 520g. In addition each light source 510 (510a through 510g) may include, for example, a red emitting laser, a green emitting laser, and a blue emitting laser. The light source 510 (510a through 510g) may provide white light by using the red emitting laser, the green emitting laser, and the blue emitting laser.

Referring to FIG. 11, light emitted from the first light source 510a may be focused on a view-point A on a focal plane via the first HOE 520a and the projection optical element 530. In addition, light emitted from the fourth light source 510d may be focused on a view-point D on the focal plane via the fourth HOE 520d and the projection optical element 530, and light emitted from the seventh light source 510g may be focused on a view-point G on the focal plane via the seventh HOE 520g and the projection optical element 530. Therefore, an image may be formed on a desired view-point by turning on any one of the plurality of light sources 510a through 510g.

A focal point of the projection optical element 530 is located at the view-point D on the optical axis OX, and thus, images formed on the view-points G and A spaced apart from the focal point may be significantly distorted due to an aberration of the projection optical element 530. According to the present exemplary embodiment, since the aberration of the projection optical element 530 may be offset using the plurality of HOEs 520a through 520g, the images formed on the view-points G and A may also not be affected due to the aberration. Therefore, the 3D display 500 according to the present exemplary embodiment may form an image on a wide area without an aberration and does not have to include a separate optical system for offsetting an aberration, and thus a size of the 3D display 500 may also be reduced.

FIGS. 12A and 12B illustrate top views for describing an operation of the 3D display 500, according to an exemplary embodiment. Referring to FIGS. 12A and 12B, for example, when a viewer's eyes are located at the view-points C and E, the third light source 510c and the fifth light source 510e may be alternately turned on/off. In addition, the SLM 550 may operate in synchronization with the on/off period of the third and fifth light sources 510c and 510e so as to alternately form two view-point images which are respectively viewed by the left eye and the right eye of the viewer. In this way, an operation of providing an image of a view-point E to the right eye of the viewer and an operation of providing an image of a view-point C to the left eye of the viewer may be repeated. Accordingly, the viewer may perceive an image having a 3D effect. Even when the viewer moves to another position, operations of the coherent light sources 510a through 510g and the SLM 550 may be coordinated with the viewer's movement by a sensing of the changed positions of the eyes of the viewer.

FIGS. 10 through 12B illustrate a 3D display for forming a multi-view image, which is applicable to the interactive 3D display apparatus according to an exemplary embodiment, but the present exemplary embodiment is not limited thereto, and various 3D displays for forming a multi-view image may be applied to the interactive 3D display apparatus according to exemplary embodiments.

Although some exemplary embodiments have been described, other various 3D displays may be applied to the interactive 3D display apparatus according to exemplary embodiments.

According to the above-described interactive 3D display apparatus according to an exemplary embodiment, a 3D stereoscopic image including a virtual object, in which a change intended by a user has been reflected, may be formed, a virtual object intended by the user may be selected, and a position, a size, and the like of the selected virtual object may be adjusted.

Figure 13:
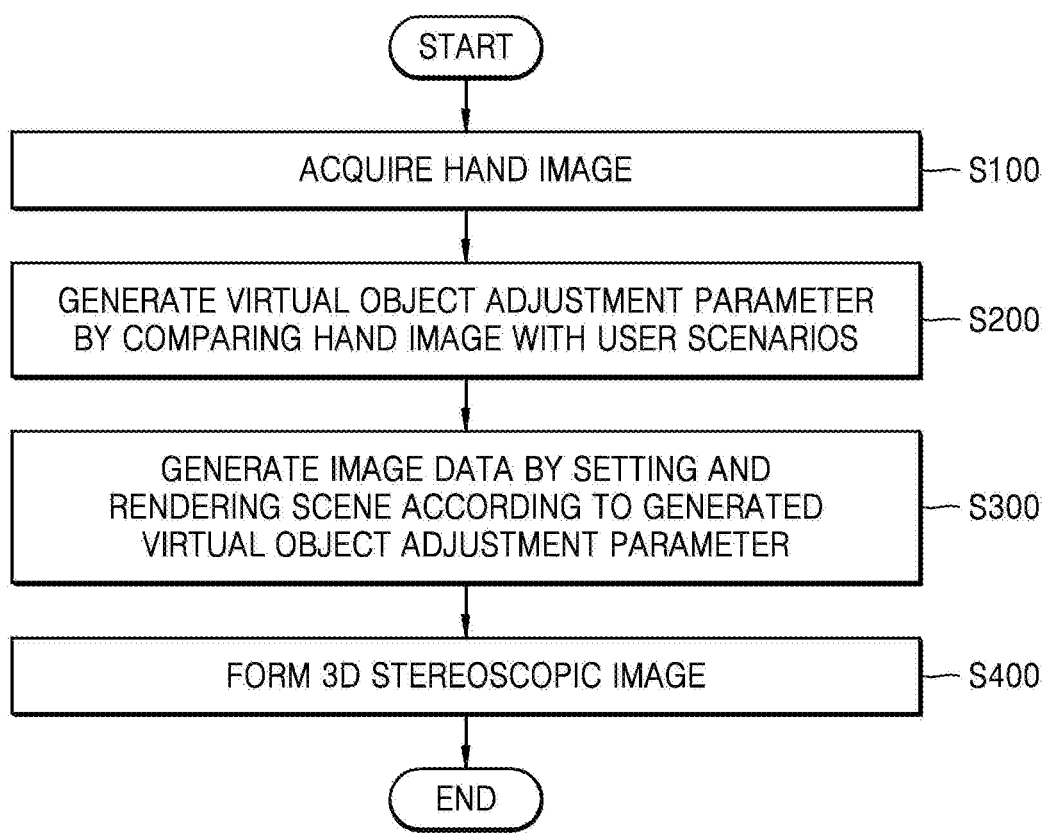
FIG. 13 illustrates a flowchart of an interactive 3D display method according to an exemplary embodiment.

FIG. 13 illustrates a flowchart of an operation of forming a 3D stereoscopic image including a virtual object, in which a change intended by a user has been reflected, by using the interactive 3D display apparatus, according to one or more exemplary embodiments.

To implement a 3D display, first, a hand image is acquired by detecting a user's hand through the gesture sensor 51 in operation S100. In operation S200, a virtual object adjustment parameter is generated by analyzing information about the hand based on the acquired hand image and comparing the analysis result with predefined user scenarios. In operation S300, image data is generated by setting a scene according to the generated virtual object adjustment parameter and rendering the set scene. In operation S400, a 3D stereoscopic image including a virtual object, in which a change intended by a user has been reflected, is displayed according to the image data through the 3D display 200.

According to the interactive 3D display apparatus and method according to one or more exemplary embodiments, a 3D stereoscopic image including a virtual object, in which a change intended by a user has been reflected, may be formed and displayed by acquiring a hand image and comparing the result obtained by analyzing the hand image with a predefined user scenario to confirm an intention of the user.

According to an exemplary interactive 3D display apparatus and method, since the use of a separate keyboard, button, or the like is not necessary, the 3D display and interaction therewith is not inconvenient for the user, and the user may interact with the 3D image using intuitive operations, as if the user were interacting with an actual object.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An interactive three-dimensional (3D) display apparatus comprising:
   a hand sensing sensor configured to acquire a hand image by detecting a hand of a user;
   an eye tracking sensor configured to acquire eye position data by tracking a position of an eye of a viewer;
   a processor configured to:
      generate a virtual object adjustment parameter, representing an intention of the user, by analyzing the hand image and comparing an analysis of the hand image with a plurality of predefined user scenarios stored in a memory,
      determine a scene according to the generated virtual object adjustment parameter and based on the acquired eye position data,
      generate image data by rendering the determined scene, and
      convert the generated image data into display data; and
   a 3D display configured to display a 3D image including a virtual object displayed in accordance with the virtual object adjustment parameter and the display data,
   wherein the generated image data depicts a selection of the virtual object by highlighting a portion of the virtual object overlapping the hand, the selection of the virtual object being made by grabbing two or more fingers including thumb when the hand and the virtual object are located in a same region,
   wherein the generated image data depicts the selection of the virtual object via displaying one of a hand-shaped cursor comprising dots and lines corresponding to fingers of the hand-shaped cursor made by grabbing two or more fingers including a thumb and displaying a virtual string connecting the hand-shaped cursor to the virtual object when the hand and the virtual object are located in different regions, and
   wherein the hand-shaped cursor is a virtual representation of the hand of the user and is separate and different from the hand of the user.

2. The interactive 3D display apparatus of claim 1, wherein the processor is further configured to:
   analyze a position of the hand, a shape of the hand, and a motion of the hand; and
   generate the virtual object adjustment parameter by searching the plurality of predefined user scenarios and comparing a result of the analyzing operation with the plurality of predefined user scenarios.

3. The interactive 3D display apparatus of claim 2, wherein the processor is further configured to parameterize at least one of the motion of the hand and a hand moving speed by confirming a position of at least one of the hand and fingers of the hand and recognizing a shape of each finger of the hand.

4. The interactive 3D display apparatus of claim 2, further comprising the memory storing the plurality of predefined user scenarios.

5. The interactive 3D display apparatus of claim 1, wherein the processor is further configured to:
   receive the virtual object adjustment parameter and determine the scene based on virtual object data, a background of each object in the scene, and a motion of each object in the scene;
   acquire the image data by rendering the scene; and
   generate 3D display data, by digitizing the acquired image data, for displaying the 3D image including the virtual object displayed in accordance with the virtual object adjustment parameter and the 3D display data.

6. The interactive 3D display apparatus of claim 5, wherein the processor is further configured to prevent an object from disappearing outside a screen.

7. The interactive 3D display apparatus of claim 6, wherein the processor is further configured to display a boundary cursor inside the screen, the boundary cursor being displayed adjacent to the object, when the object moves outside the screen and control the object outside the screen when the boundary cursor is manipulated.

8. The interactive 3D display apparatus of claim 6, wherein the processor is further configured to hold an object to be definitely displayed on the screen and prevent the object from moving outside the screen when a boundary portion of the object overlaps an edge of the screen and to display a holding state of the object.

9. The interactive 3D display apparatus of claim 5, wherein the processor is further configured to determine the scene, when the virtual object is selected on a screen, so as to select the virtual object by matching the hand and the virtual object when the hand and the virtual object are located in a same region or to select the virtual object via one of the hand-shaped cursor and the virtual string connecting the hand-shaped cursor to the virtual object when the hand and the virtual object are located in different regions.

10. The interactive 3D display apparatus of claim 9, wherein the hand-shaped cursor is one of a hand image cursor and a hand-shaped cursor comprising dots and lines.

11. The interactive 3D display apparatus of claim 1, wherein the 3D display comprises:
   a spatial light modulator configured to form a 3D stereoscopic image according to the display data; and
   a lighting source configured to provide left-eye illumination light and right-eye illumination light to the spatial light modulator and further configured to form an image for a left eye and an image for a right eye.

12. The interactive 3D display apparatus of claim 11, wherein the lighting source further comprises a beam deflector configured to deflect the left-eye illumination light and the right-eye illumination light according to the eye position data acquired by the eye tracking sensor.

13. The interactive 3D display apparatus of claim 1, wherein the 3D display comprises:
   a light source;
   at least one projection optical element configured to focus light, emitted from the light source, onto a focal plane;
   a plurality of holographic optical elements disposed between the light source and the at least one projection optical element, the plurality of holographic optical elements comprising an interference pattern configured to diffract the light emitted from the light source and direct the diffracted light to the at least one projection optical element, wherein the plurality of holographic optical elements focus incident light on a plurality of different positions on the focal plane; and
   a spatial light modulator configured to form a stereoscopic image on the focal plane of the at least one projection optical element according to the display data.

14. An interactive three-dimensional (3D) display method comprising:
   acquiring a hand image by detecting a hand of a user;
   acquiring, from an eye tracking sensor, eye position data by tracking a position of an eye of a viewer;
   generating a virtual object adjustment parameter, representing an intention of the user, by analyzing the acquired hand image and comparing an analysis of the hand image with a plurality of predefined user scenarios;
   generating image data by determining a scene according to the generated virtual object adjustment parameter and based on the acquired eye position data, and rendering the determined scene; and
   forming on a 3D display a 3D stereoscopic image including a virtual object displayed in accordance with the virtual object adjustment parameter,
   wherein the generated image data depicts a selection of the virtual object by highlighting a portion of the virtual object overlapping the hand, the selection of the virtual object being made by grabbing two or more fingers including a thumb when the hand and the virtual object are located in a same region,
   wherein the generated image data depicts the selection of the virtual object via displaying one of a hand-shaped cursor comprising dots and lines corresponding to fingers of the hand-shaped cursor made by grabbing two or more fingers including a thumb and displaying a virtual string connecting the hand-shaped cursor to the virtual object when the hand and the virtual object are located in different regions, and
   wherein the hand-shaped cursor is a virtual representation of the hand of the user and is separate and different from the hand of the user.

15. The interactive 3D display method of claim 14, wherein the generating the virtual object adjustment parameter comprises:
   analyzing a position of the hand, a shape of the hand, and a gesture of the hand from the acquired hand image; and
   generating the virtual object adjustment parameter by searching the plurality of predefined user scenarios and comparing an analysis result about the position of the hand, the shape of the hand, and the gesture of the hand with the plurality of predefined user scenarios.

16. The interactive 3D display method of claim 15, wherein the predefined user scenarios are stored in a storage.

17. The interactive 3D display method of claim 14, wherein the generating of the image data comprises:
   receiving the generated virtual object adjustment parameter and determining the scene based on virtual object data, a background of each object in the scene, and a motion of each object in the scene;
   acquiring image data by rendering the determined scene;
   a 3D image encoding operation of generating 3D display data, by digitizing the acquired image data, for displaying a 3D image including the virtual object displayed in accordance with the virtual object adjustment parameter,
   inputting the generated display data to the 3D display.

18. The interactive 3D display method of claim 17, wherein the determining of the scene comprises displaying a scene boundary and preventing an object from disappearing outside a boundary of a screen, and
   the displaying of the scene boundary comprises displaying a boundary cursor inside the screen, wherein the boundary cursor is adjacent to the object, when the object moves outside the screen or preventing the object from moving outside the screen and displaying a holding state of the object.

19. The interactive 3D display method of claim 17, further comprising, when the virtual object is selected on a screen by using the hand of the user, selecting the virtual object is selected by one of:
   matching the hand and the image with each other,
   displaying the hand-shaped cursor comprising dots and lines, and displaying the virtual string connecting the virtual object to the hand-shaped cursor.

20. An interactive three-dimensional (3D) display apparatus comprising:
   a hand sensing sensor configured to acquire a hand image by detecting a hand of a user;
   a processor configured to:
      generate a virtual object adjustment parameter, representing an intention of the user, by analyzing the hand image and comparing an analysis of the hand image with a plurality of predefined user scenarios stored in a memory,
      determine a scene according to the generated virtual object adjustment parameter,
      generate image data by rendering the determined scene, and
      convert the generated image data into display data; and
   a 3D display configured to display a 3D image including a virtual object displayed in accordance with the virtual object adjustment parameter and the display data,
   wherein the generated image data depicts a selection of the virtual object by highlighting a portion of the virtual object overlapping the hand, the selection of the virtual object being made by grabbing two or more fingers including a thumb when the hand and the virtual object are located in a same region,
   wherein the generated image data depicts the selection of the virtual object via displaying one of a hand-shaped cursor comprising dots and lines corresponding to fingers of the hand-shaped cursor made by grabbing two or more fingers including a thumb and displaying a virtual string connecting the hand-shaped cursor to the virtual object when the hand and the virtual object are located in different regions, and wherein the hand-shaped cursor is a virtual representation of the hand of the user and is separate and different from the hand of the user.

* * * * *